(12) United States Patent
Mukherjee (10) Patent No.: US 6,862,371 B2
(45) Date of Patent: Mar. 1, 2005

(54) METHOD OF COMPRESSING IMAGES OF ARBITRARILY SHAPED OBJECTS

(75) Inventor: Debargha Mukherjee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 621 days.

(21) Appl. No.: 10/036,985

(22) Filed: Dec. 31, 2001

(65) Prior Publication Data

US 2003/0123740 A1 Jul. 3, 2003

(51) Int. Cl.[7] ................................................. G06K 9/36
(52) U.S. Cl. ..................... 382/248; 382/232; 382/249
(58) Field of Search ............................... 382/252, 248, 382/249, 245, 250; 375/240.14, 240.11; 345/474, 536

(56) References Cited

U.S. PATENT DOCUMENTS 4,924,388 A * 5/1990 Stansfield et al. ........... 345/474
5,107,348 A * 4/1992 Citta et al. .............. 375/240.14

FOREIGN PATENT DOCUMENTS

| EP | 0649258 | 4/1995 | ............ H04N/7/24 |
| WO | WO 97/36419 | * 10/1997 | ............ H04N/1/41 |

OTHER PUBLICATIONS

Coltman et al., "Hierarchical Watermarking Depending on Local Constraints", IEEE International Conference on Image Processing, vol. 3, Oct. 2001, pps. 1011–1014.*

Yabin Yu et al: "Pictorial Transform Coding for Tessellating Arbitrary Shaped Regions" Signal Processing Theories and Applications, Barcelona, Sep. 18–21, 1990. pp. 901–904 XP000365734.

* cited by examiner

Primary Examiner—Anh Hong Do (57) ABSTRACT

A method of manipulating spectral content of a block of pixels for compression includes the step of classifying each pixel within a selected block of pixels as relevant or irrelevant. A forward transform is applied to the selected block to generate a coefficient block. The coefficient values are modified to generate a modified coefficient block subject to a set of pre-determined constraints including a constraint that the relevant pixels have a same value in an inverse transformation of the modified coefficient block as in the selected block. Proceeding in a reverse zig zag coefficient order the method is repeated for other coefficients having non-zero quantized values.

20 Claims, 9 Drawing Sheets

METHOD OF COMPRESSING IMAGES OF ARBITRARILY SHAPED OBJECTS

FIELD OF THE INVENTION

This invention relates to the field of data compression. In particular, this invention is drawn to rate optimizing data compression.

BACKGROUND OF THE INVENTION

Continuous tone images refer to images that have a virtually unlimited range of color or shades of gray. Photographs, for example, are continuous tone images. Digital hardware, however, is limited to expressing color or tone within a finite number of bits or even a single bit (i.e., "on" or "off"). Typically the continuous tone image is decomposed into an array of picture elements (pixels), each element capable of representing a finite number of colors or shades. Gray scaling and dithering are two processes used to approximate continuous tone images within the limitations of digital hardware. The digital representations of images simplify reproduction, storage, modification, and distribution of the images.

Once the continuous tone image is discretized into digital form, the digital form may be further processed to reduce storage requirements through compression. Compression eliminates information in a manner that results in either no visually perceptible differences or only acceptable visually perceptible differences between the digitized source image and the reconstructed image.

Some approaches to image compression entail direct manipulation of the spectral content. Reducing the spectral energy without regard to other factors frequently does not achieve optimal storage results due to rate influencing elements such as quantization and entropy encoding that are present in spectral content manipulating compression processes.

SUMMARY OF THE INVENTION

In view of limitations of known systems and methods, methods and apparatus for compressing source images are provided.

A method of manipulating spectral content of a block of pixels for compression includes the step of classifying each pixel within a selected block of pixels as relevant or irrelevant. A forward transform is applied to the selected block to generate a coefficient block. The coefficient values are modified to generate a modified coefficient block subject to a set of pre-determined constraints including a constraint that the relevant pixels have a same value in an inverse transformation of the modified coefficient block as in the selected block.

Another method of manipulating spectral content of a block of pixels for compression includes the step of providing a source block of pixels from a source image. The pixels are classified as either modifiable or nonmodifiable. A forward transform is performed on the selected block to generate a coefficient block. The coefficient block is quantized. At least one coefficient is subsequently modified to produce a corresponding zero quantized coefficient subject to a plurality of constraints. In particular, the coefficient is modified without altering pixel values of an inverse transform that correspond to nonmodifiable pixels in the selected block.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Block compression algorithms are prevalent in image processing applications. Regardless of the shape of the image, the image data is captured in blocks for processing by the block compression algorithm. Some blocks may consist entirely of pixels representing portions of the source image. Other blocks may include pixels representing portions of the source image and pixels that are not associated with the source image as a result of the shape of the block not conforming to the shape of the image. Still other blocks may consist entirely of pixels that are not associated with the source image at all.

Figure 1:
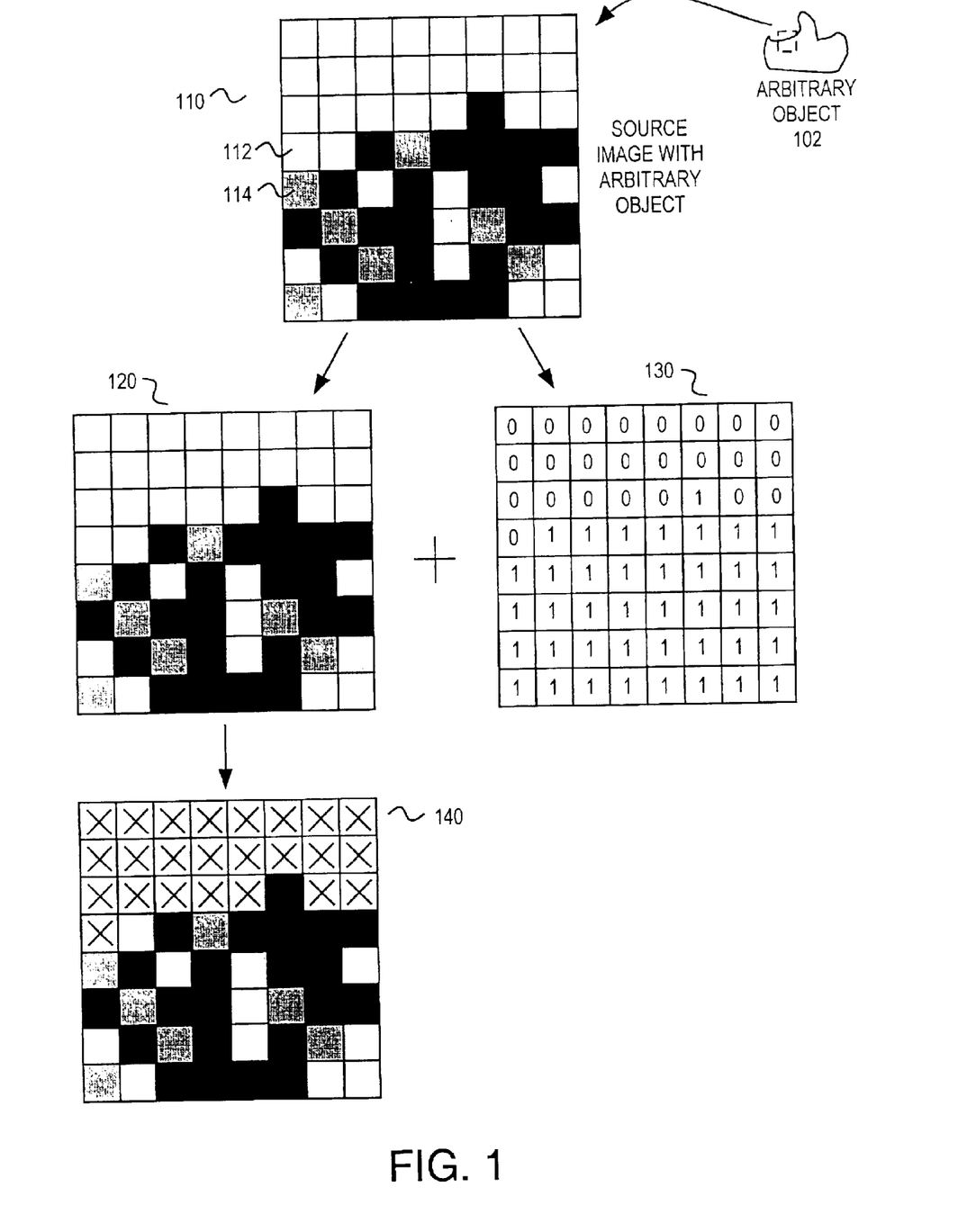
FIG. 1 illustrates decomposition of an 8×8 block from a source image of an arbitrarily shaped object into an image plane and a mask.

FIG. 1 illustrates a selected 8×8 block 110 of pixels from a sample discretized source image containing an arbitrarily shaped object 102. Portions of the selected block corresponding to the arbitrarily shaped object are indicated by the shaded pixels. In one embodiment, each pixel has an associated 8 bit value such that up to 256 distinct colors or gray levels may be realized (i.e., 0–255).

The selected block is decomposed into encodeable planes. A graylevel selected block 110 might be decomposed into a block 120 and a mask 130. In an alternative embodiment, the source image block may be decomposed into a plurality of planes and associated masks, each associated with a distinct color plane of the image.

Block 120 is simply the source block 110. Mask 130 consists of a plurality of "1"s and "0"s that indicate whether a particular pixel from block 120 forms a portion of the arbitrarily shaped object (e.g., pixel 114) or the background (e.g., pixel 112). The mask effectively identifies the pixels of block 120 that are to be preserved and enables discrimination of the arbitrarily shaped object from its background. The mask thus inherently identifies selected block pixels as "relevant" or "irrelevant" with respect to the arbitrarily shaped object of interest.

The block compression algorithm is applied to block 120. Typically the mask is stored with the compressed data to aid in reconstructing the source image from the compressed data. When the source block is reconstructed from the compressed data, the mask is then used to identify the relevant pixels. The amount of compression achievable is a function of the amount of acceptable loss of information of the source block, the compression algorithm selected, and the features of the image in the block. Recognizing that the particular combination and position of pixel values has an affect on the amount of compression, one method of data compression effectively modifies the values of irrelevant pixels to achieve greater compression.

Block 120 is redrawn as block 140 with "X"s used to emphasize the location of pixels that are "don't cares" or "irrelevant" based on the mask 130. The values of pixels marked with an "X" are not important because they will be excluded with the mask 130 anyway. Although the value of these "don't care" pixels are irrelevant to the reconstruction of the arbitrarily shaped object, the value of the pixels may affect the compression rate of block 120. Accordingly, the encoding technique can be modified to change the values of these "don't care" pixels in order to achieve greater compression efficiencies. This approach will not affect the reproduction quality and does not require modification of the decoding algorithm.

There are many contexts under which some pixels may be deemed modifiable due to their irrelevance to the reconstruction of the source image. Frequently, an original source image is decomposed into multiple planes for compression. For example, an image may be decomposed into separate color planes for processing. An image may be decomposed into foreground/background planes which are used in conjunction with a mask to specify which plane the pixel is to be sourced from during reconstruction of the source image. An arbitrarily shaped object in front of a background, for example, may be discriminated from the background through the use of a mask that identifies pixels that form a portion of the arbitrarily shaped object rather than the background. Such a mask is useful when the background itself is not of interest. In this case, the mask inherently identifies relevant and irrelevant pixels and thus indicates the pixels that may be modified.

Figure 2:
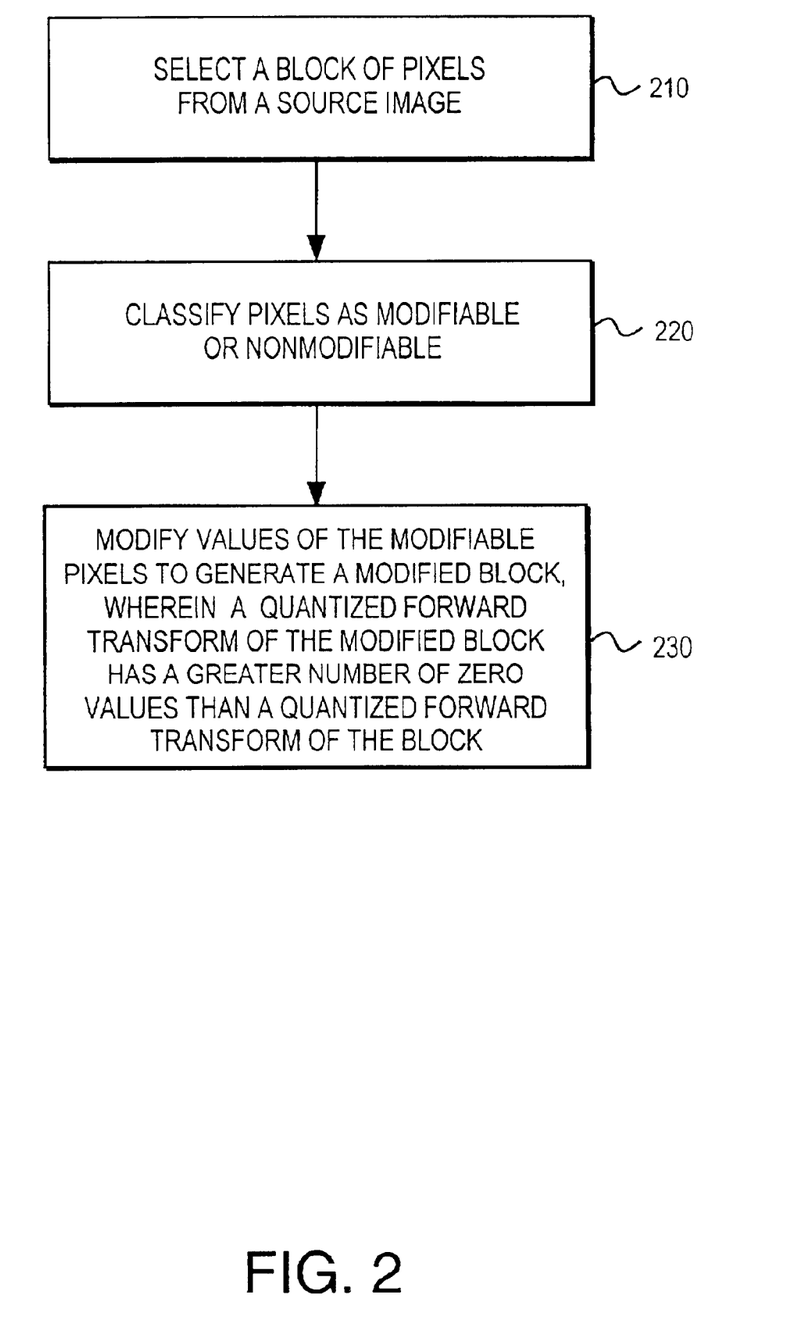
FIG. 2 illustrates a method of changing selected pixel values to improve the compression rate.

FIG. 2 illustrates one method of compressing data as the operation might be conducted in the spatial domain. In step 210, a source block consisting of a plurality of pixels is selected from the source image. In step 220, the plurality of pixels is categorized into at least two classes. A first class of pixels is designated as irrelevant or modifiable. The second class is designated as relevant or nonmodifiable. For example, pixels associated with the arbitrarily shaped object are designated as nonmodifiable. Pixels associated with the background or otherwise not associated with the object of interest are designated as modifiable. Referring to FIG. 1, mask 130 inherently determines the class that each corresponding pixel in the source block belongs to (e.g., 1=nonmodifiable, 0=modifiable).

One technique for compressing the digital representation of source image data includes the step of transforming the spatial domain image data into frequency domain data. Transformation from the spatial domain into the frequency domain is also referred to as a forward transformation.

Forward transformation is analogous to a harmonic analysis of the source image. A forward transform is used to represent the spatial image data as linear combinations of basis functions. The coefficients for these basis functions are determined during the transformation process.

The basis coefficients are then quantized or thresholded to eliminate contributions from the corresponding basis function to achieve some level of compression. The remaining coefficients are then re-ordered or run-length encoded or otherwise processed to facilitate further compression of the image data. The resulting compressed image data is then available for storing, distribution, or for further processing. This is the basic technique promulgated by the Joint Photographic Experts Group (JPEG).

Typically, the greater the number of zero-valued quantized coefficients, the greater the rate of compression. Accordingly, in step 230, the values of the modifiable pixels are modified to decrease the number of non-zero quantized coefficients. The modifiable pixels are modified so that a quantized forward transform of the modified block has a greater number of zero values than a quantized forward transform of the selected block. This operation reduces the "rate" of the compressed image, where "rate" is a reference to the storage requirements of the compressed image. The operation thus increases the compression efficiency or rate efficiency of the image encoder.

The manner in which pixels are modified depends upon the specifics of the compression algorithm. The Joint Photographic Experts Group and the Motion Picture Experts Group (MPEG) have each promoted popular image compression and encoding architectures that manipulate spectral content to achieve data compression. JPEG compression is frequently used for static images such as those encountered in facsimile or standard printing applications. The MPEG format is used for dynamic images or movies. The basic process has been promulgated by JPEG and is in widespread use today. Although JPEG utilizes a Discrete Cosine Transformation (DCT), specific implementations of the forward transform, quantization, and entropy encoding blocks is left to the implementer.

Figure 3:
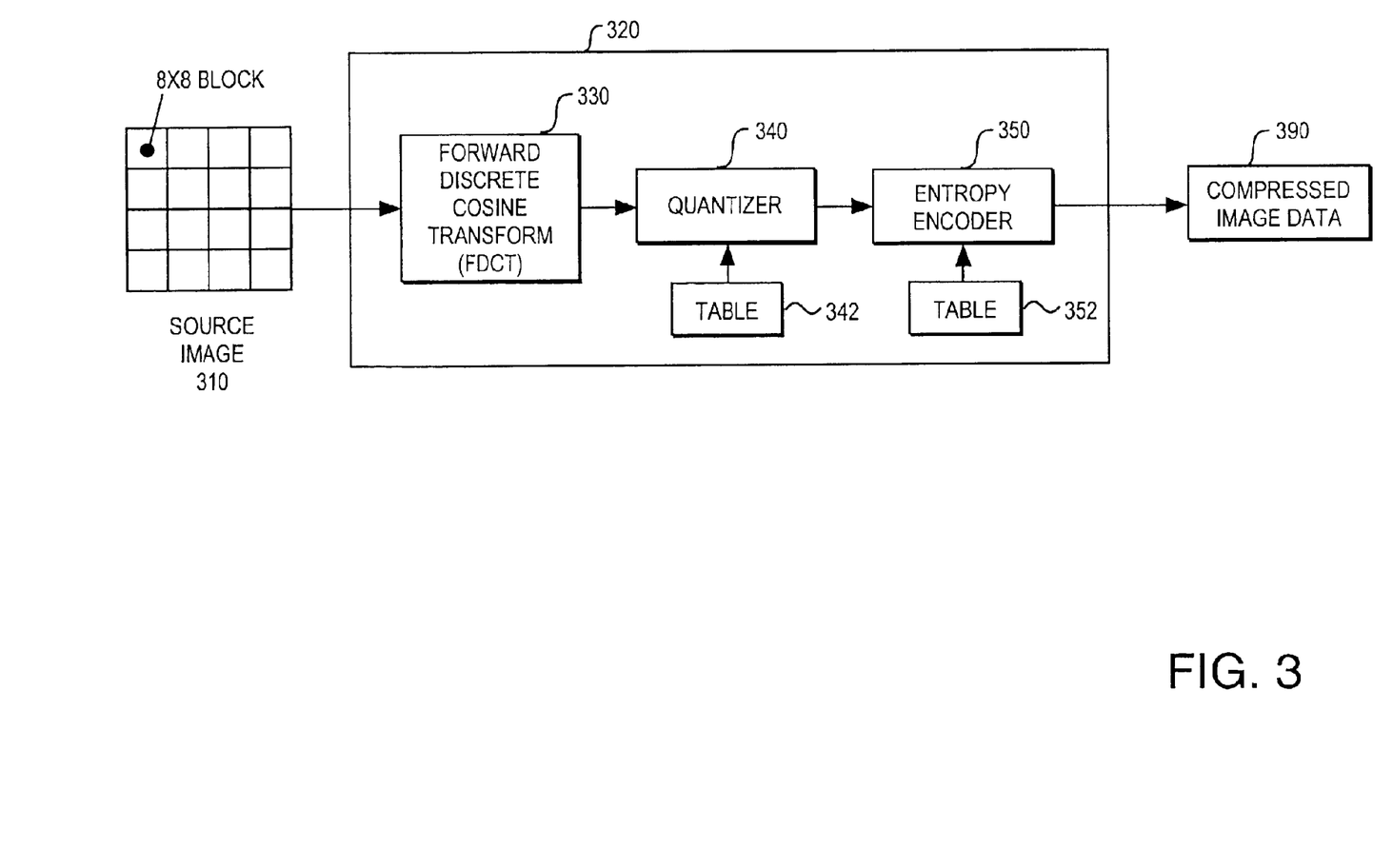
FIG. 3 illustrates one embodiment of a block oriented compression process.

FIG. 3 illustrates one embodiment of a block-based process for compressing an image in greater detail. The image encoder 320 processes a discretized source image 310 to produce compressed image data 390.

Encoder 320 processes the source image 310 as a plurality of 8×8 source blocks. A forward transformation is performed on each 8×8 source block. Each 8×8 source block is a 64-point discrete signal that is a two-dimensional spatial function of x and y. The DCT is one of many transforms that can be used to represent signals as linear combinations of basis functions. Although the DCT is the selected transform for JPEG compression, other linear forward transforms such as the Fourier transform and the Discrete Sine Transform (DST) may be used.

The forward DCT is a harmonic analyzer that converts the 64 point discrete signal into 64 orthogonal basis signals. Each orthogonal basis signal represents a two dimensional spatial frequency forming the spectrum of the 8×8 source block. The output of the forward DCT is a coefficient block identifying the amplitude of each of these orthogonal basis signals. The amplitudes are referred to as DCT coefficients and the values are determined by the discrete 64 point input signal.

A source image is sampled as a two dimensional array of discrete values, $s(x,y)$. Performing a two dimensional forward transform entails calculating the basis coefficients $c(u,v)$ such that $s(x,y)$ can be expressed as a linear combination of basis functions. In one embodiment (DCT), a forward transform involves calculating $c(u,v)$ such that:

$$s(x, y) = \sum_{u=0}^{N-1} \sum_{v=0}^{N-1} c(u, v) \lambda(u, v) \cos\left(\frac{(2x+1)u\pi}{2N}\right) \cos\left(\frac{(2y+1)v\pi}{2N}\right)$$

$$\begin{cases} u, v \in [0, N-1] \\ \lambda(0, v) = 1/N \\ \lambda(u, 0) = 1/N \\ \lambda(u, v) = 2/N \text{ for } u, v \neq 0 \end{cases}$$

In one embodiment of the DCT, the coefficients c(u, v) are calculated as follows:

$$c(u, v) = \lambda(u, v) \sum_{y=0}^{N-1} \sum_{x=0}^{N-1} s(x, y) \cos\left(\frac{(2x+1)u\pi}{2N}\right) \cos\left(\frac{(2y+1)v\pi}{2N}\right);$$

$$u, v \in [0, N-1]$$

The two dimensional DCT transform involves identifying the coefficients for a set of basis functions that collectively make up the image.

Referring again to FIG. 3, quantizer 340 quantizes the DCT coefficients in accordance with a quantization table 342. Different quantums can be used with different spatial frequencies as identified by quantization table 342. The quantized c(u,v) may be calculated as follows:

$$C^Q(u, v) = INT\left(\frac{c(u, v)}{q(u, v)}\right)$$

where "INT" is an integer function to ensure the result is an integer.

The quantization table permits different step sizes for different basis functions. The quantization table is thus a 64 element table, one element for each spatial frequency. Generally, step sizes for higher frequency basis functions are larger than the step sizes for lower frequency basis functions. The step sizes are typically chosen at the perceptual threshold for the visual contribution of the corresponding cosine basis function. The perceptual threshold are functions of the source image characteristics, display characteristics, viewing distance, etc. Thus the choice of quantization table may be application dependent.

After quantization, entropy encoding is used to efficiently represent the quantized coefficients. Entropy encoder 350 uses entropy encoding table 352 to generate the compressed image data 390.

Briefly, the number of previous zeros and the bits needed to represent the current quantized coefficient value form a pair. Each pair has its own code word assigned through a variable length code. Huffman, Shannon-Fano, and arithmetic coding are examples of commonly used variable length coders. The more often a given element occurs, the smaller the number of bits that are used for the corresponding code. The JPEG encoder outputs the code word for the pair and then a code word for the current quantized coefficient (also assigned by a variable length coder).

After processing a block of quantized DCT coefficients, the JPEG encoder writes a unique end of block sequence and then moves to the next block. After finishing all blocks, the JPEG encoder writes an end-of-file marker. Tables 352 and 342 may be incorporated into the compressed image data to facilitate reconstruction.

Figure 4:
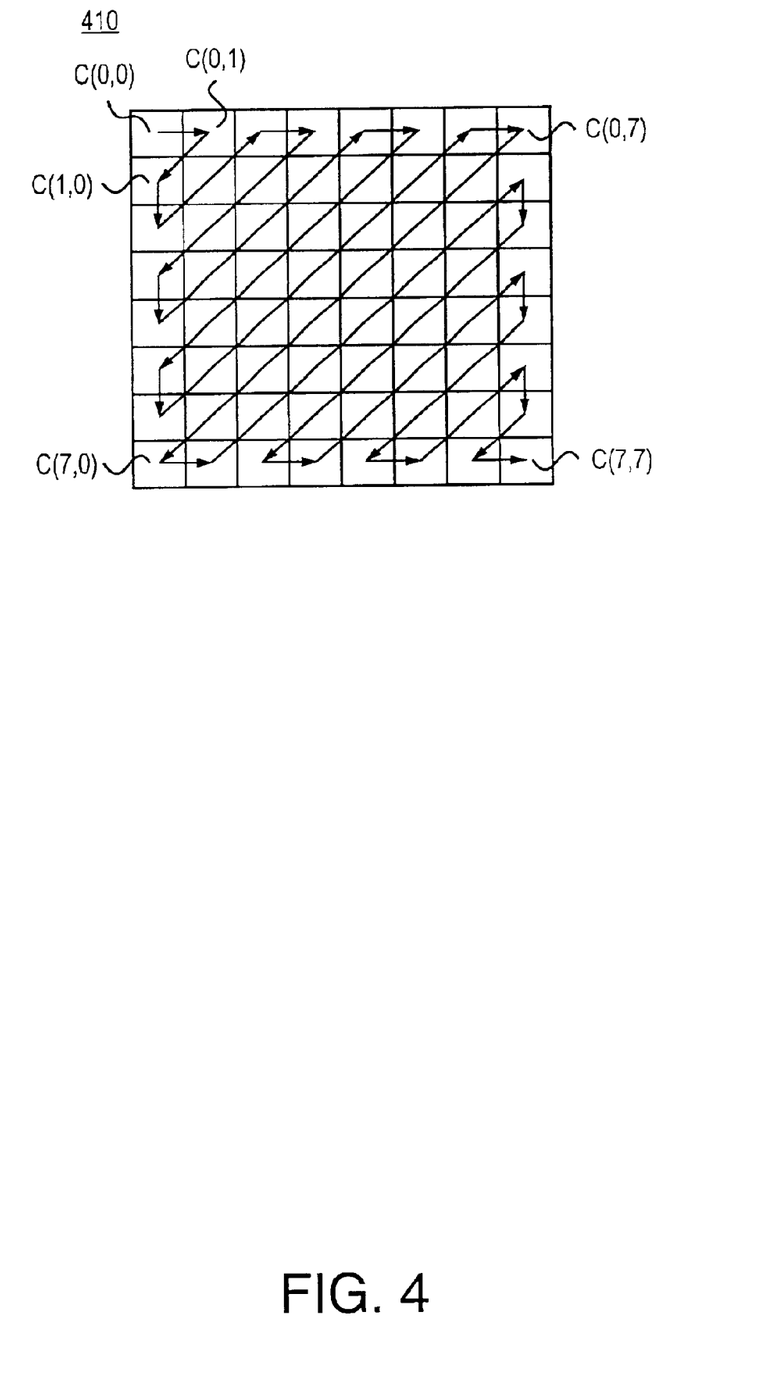
FIG. 4 illustrates a zig-zag processing order for entropy encoding coefficients.

The result of quantization is that many of the DCT coefficients have been reduced to zero. In particular, coefficients corresponding to higher frequency cosine basis functions tend to be zero. Ordering quantized DCT coefficients to obtain longer strings of zero-valued elements improves the rate efficiency of the entropy encoder, particular at the point where any remaining quantized DCT coefficients to be encoded are all zero. Accordingly, the entropy encoder encodes the quantized DCT coefficient block in a zig-zag manner progressing from quantized coefficients associated with lower frequency basis functions to the quantized coefficients associated with higher frequency basis functions as illustrated in FIG. 4.

The upper left corner of block 410 corresponds to the DC term (u, v=0). The DC terms are differentially encoded across individual encoded blocks. The remaining AC terms represent higher frequency cosine basis functions when progressing towards the lower right corner. The JPEG entropy encoder need only encode up to the highest frequency non-zero quantized coefficient before writing an end of block. Any other coefficients are presumed to be zero.

The zig-zag scan order tends to group the number of non-zero elements at one end of the string of elements to be encoded. When the higher frequency basis coefficients are zero, the zig-zag scan order groups the zero elements at the end of the string of quantized coefficients being coded, thus improving the rate efficiency of the entropy encoder. The JPEG encoder need not encode beyond the last non-zero quantized coefficient in the scan order. Given that the higher order frequencies are likely to be zero, the zig-zag scan order thus increases the compression efficiency of the JPEG encoder.

Figure 5:
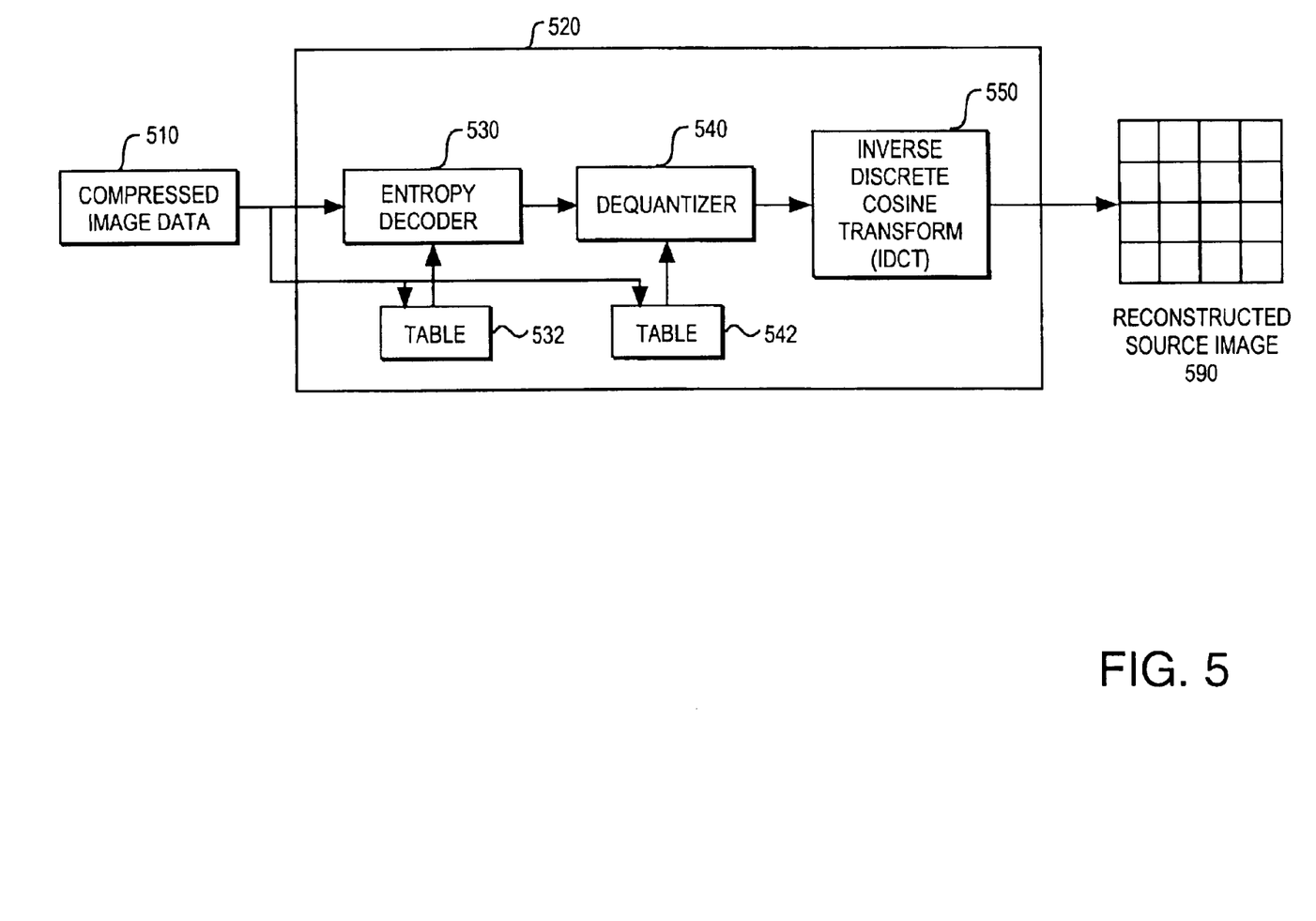
FIG. 5 illustrates one embodiment of a process for de-compressing an image compressed with the method of FIG. 3.

FIG. 5 illustrates a decoder 520 for generating a reconstructed source image 590 from the compressed image data 510. An entropy decoder 530 and entropy decoder table 532 are used to recover the quantized DCT coefficients. Dequantizer 540 uses dequantizer table 542 to generate the dequantized DCT coefficients. In one embodiment, dequantizer table 542 is the same as quantizer table 342. An inverse transform is performed on the dequantized coefficients to generate the reconstructed source image. For JPEG applications, block 550 performs an inverse DCT transformation on the dequantized DCT coefficients to obtain the reconstructed source image 590.

The basic spectral manipulation encoding process can be modified to permit modification of pixel values that are irrelevant to reconstruction of the source image, but might have significant effects on rate efficiency.

The 64 pixels in a block are denoted as vector $\underline{z}$ which is comprised of two smaller vectors $\underline{y}$ and $\underline{x}$ such that $$\underline{z}^T = \{\underline{y}^T \underline{x}^T\}$$

where $\underline{y}$ is the set of $N_y$ relevant pixels and $\underline{x}$ is the set of $64-N_y$ irrelevant pixels. The 64×64 2D DCT transformation matrix for the vector is denoted T so that the coefficient set $\underline{c}$ is given by $\underline{c} = T\underline{z}$.

One approach might be to solve for the vector $\underline{x}$ in $\underline{z}$ that minimizes the energy of the AC coefficients while leaving the known vector $\underline{y}$ unaffected. The cost function to be minimized is then given by $$J(x) = \sum_{i=1}^{63} c_i^2$$

$$= \|\underline{c}\|^2 - c_0^2$$

$$= \|\underline{z}\|^2 - c_0^2$$

$$= \|x\|^2 + \|y\|^2 - c_0^2$$

$$= \sum_{i=0}^{63-N_y} x_i^2 + \|y\|^2 - c_0^2$$

The DC coefficient for 2D DCT is given by:

$$c_0 = \frac{1}{8}\sum_{i=0}^{63} z_i$$

$$= \frac{1}{8}\sum_{i=0}^{N_y-1} y_i + \frac{1}{8}\sum_{i=0}^{63-N_y} x_i$$

When $J(\underline{x})$ is partially derived with respect to each element $x_i$ of $\underline{x}$ and equated to zero, each element is found to yield the same optimal value given by:

$$x_i = \frac{1}{N_y}\sum_{i=0}^{N_y-1} y_i$$

Thus the optimal interpolation for the modifiable pixels in terms of minimizing energy of AC coefficients is the solution that sets the values of all the modifiable pixels to the average of the nonmodifiable pixels. This approach might be a good starting point but it ignores the effects of differential DC coding and the particulars of the block compression algorithm entropy encoder.

The goal is to find $\underline{z}$ that minimizes the rate by maximizing zero runs along the reverse zig-zag scanning path while satisfying other constraints. For example, any modifiable $z_i$ must be assigned a pixel value within the realizable range and $z_i$ for nonmodifiable pixels should not change giving:

$$z_i = y_i \; i = \{0, 1, \ldots, N_y - 1\}$$

$$0 \leq z_i \leq 255 \; i = \{N_y, \ldots, 63\}$$

Consider the DCT coefficients for the modified block. Some coefficients are quantized to zero while others are quantized to non-zero values. The locations (i.e., indices) of the coefficients that can be quantized to zero form the set $I_{zero}$ such that $$I_{zero} = \left\{ i \left| -\frac{q_i}{2} < c_i < \frac{q_i}{2}; i \in \{0, 1, \ldots, 63\} \right. \right\}$$

The coefficients are scanned in reverse zig-zag scan order to find the first one, $c_j$, that is not quantized to zero. If it is possible to "push" the coefficient to zero without violating the other constraints then there is a solution $\underline{z}$ which satisfies the previous constraints:

$$z_i = y_i \; i = \{0, 1, \ldots, N_y - 1\}$$

$$0 \leq z_i \leq 255 \; i = \{N_y, \ldots, 63\}$$

as well as the following constraint obtained from the $I_{zero}$ set:

$$-\frac{q_i}{2} < c_i = \underline{t}_i^T \underline{z} < \frac{q_i}{2}, i \in I_{zero'}$$

(i.e., no zero-quantized coefficient may become non-zero quantized) that also satisfies the following constraint:

$$-\frac{q_j}{2} < c_j = \underline{t}_j^T \underline{z} < \frac{q_j}{2}$$

The term $\underline{t}_i$ represents the $i^{th}$ row of DCT matrix T. Each zero quantization constraint is a linear inequality constraint. The existence of a feasible solution is a Phase 1 linear programming problem which can be readily solved using techniques such as the simplex method. Modification of coefficient values will not affect the value of relevant pixels as a result of the equality constraints limiting such modifications. Relevant pixels in the selected block will have the same value as corresponding pixels in an inverse transform of the modified coefficient block. The inverse transform of the modified coefficient block is a modified selected block.

If a solution exists, then the index of the new zero quantized coefficient is added to the $I_{zero}$ set and $\underline{z}$ is updated to the feasible solution. If, $c_j$ is not zero quantizable, then the method proceeds to the next non-zero coefficient proceeding in the reverse zig zag order. The process may be repeated until all non-zero quantized coefficients have been tested.

Although the resulting solution satisfies all the constraints, the solution may not be optimal in the sense of minimizing the energy of the coefficients. In addition to maximizing the length or number of zero runs, the energy of the non-zero quantized coefficients should be minimized to reach the lowest rate. The minimum energy solution at each stage minimizes:

$$E(\underline{z}) = \left( c_0 - \frac{8}{N_y}\sum_{i=0}^{N_y-1} y_i \right)^2 + \sum_{i=1}^{63} c_i^2$$

subject to the previously established constraints:

$$-\frac{q_i}{2} < c_i = \underline{t}_i^T \underline{z} < \frac{q_i}{2}, i \in I_{zero}$$

$$z_i = y_i \quad i = \{0, 1, \ldots, N_y - 1\}$$

$$0 \leq z_i \leq 255 \quad i = \{N_y, \ldots, 63\}$$

The dc value is considered differentially with respect to the mean of the relevant pixel values. The above problem is a quadratic cost function subject to a series of linear equality and inequality constraints. A quadratic program may be applied to identify a solution. The quadratic solver needs only to be invoked after the successive Phase 1 linear programs.

The successive linear programs yield solutions with increasing numbers of zero quantized coefficients which may result in the energy of the remaining DCT coefficients becoming higher than that of the optimal average interpolated block. If the energy increases too much, the rate may increase even if zero runs have been maximized.

To avoid this outcome, the quadratic program may be invoked at each stage after a feasible solution has been found. In this case, the quadratic program uses a stopping criterion based on the ratio of the coefficient energies of the newest modified block versus that of the average interpolated block. If the energy E of the modified selected block exceeds a pre-determined proportion $T_E(T_E>1)$ of the energy $E_0$ of the average interpolated block then the optimization is terminated to avoid leading to a higher rate.

Figure 6:
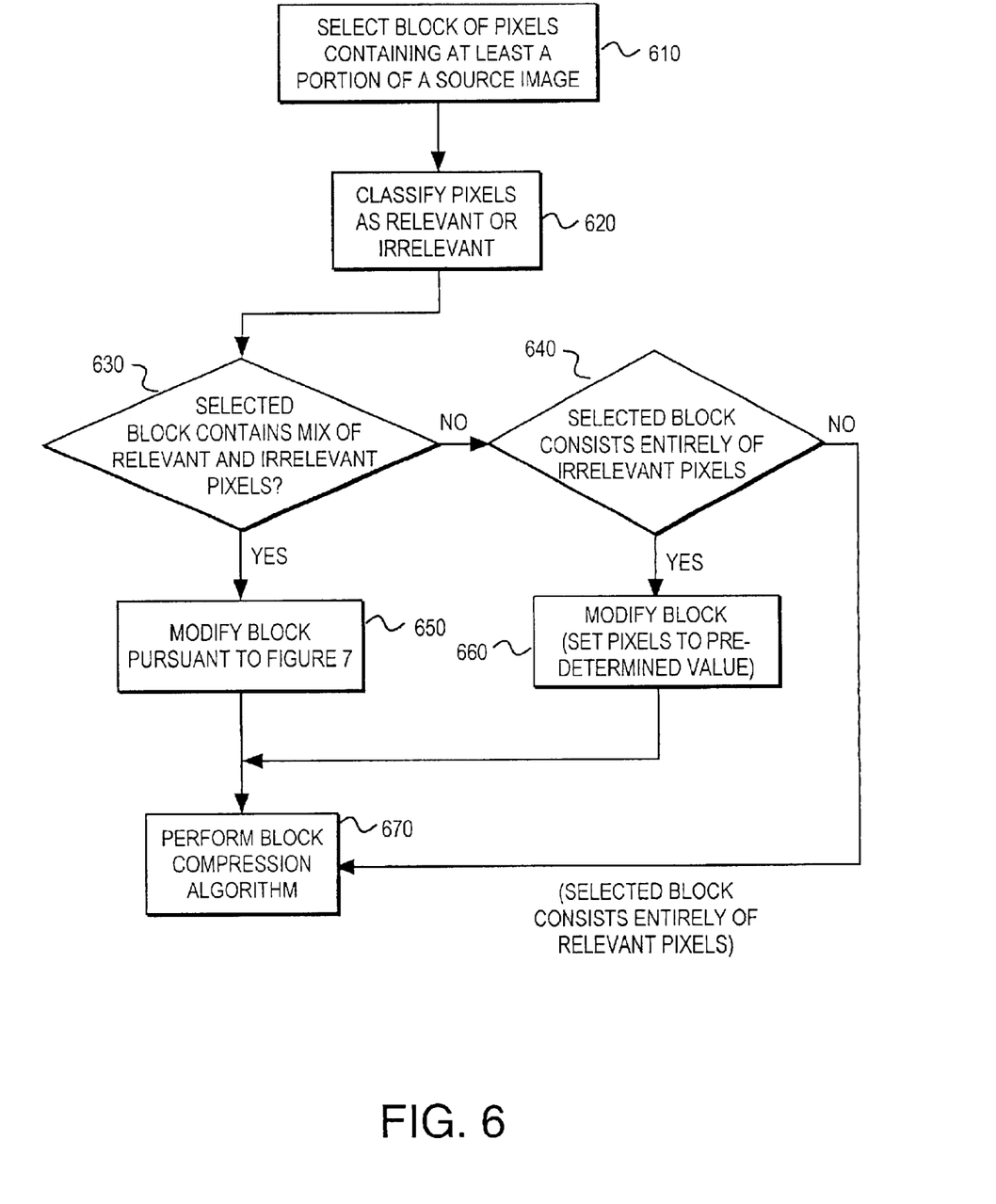
FIG. 6 illustrates the routing of blocks for compression.
Figure 7:
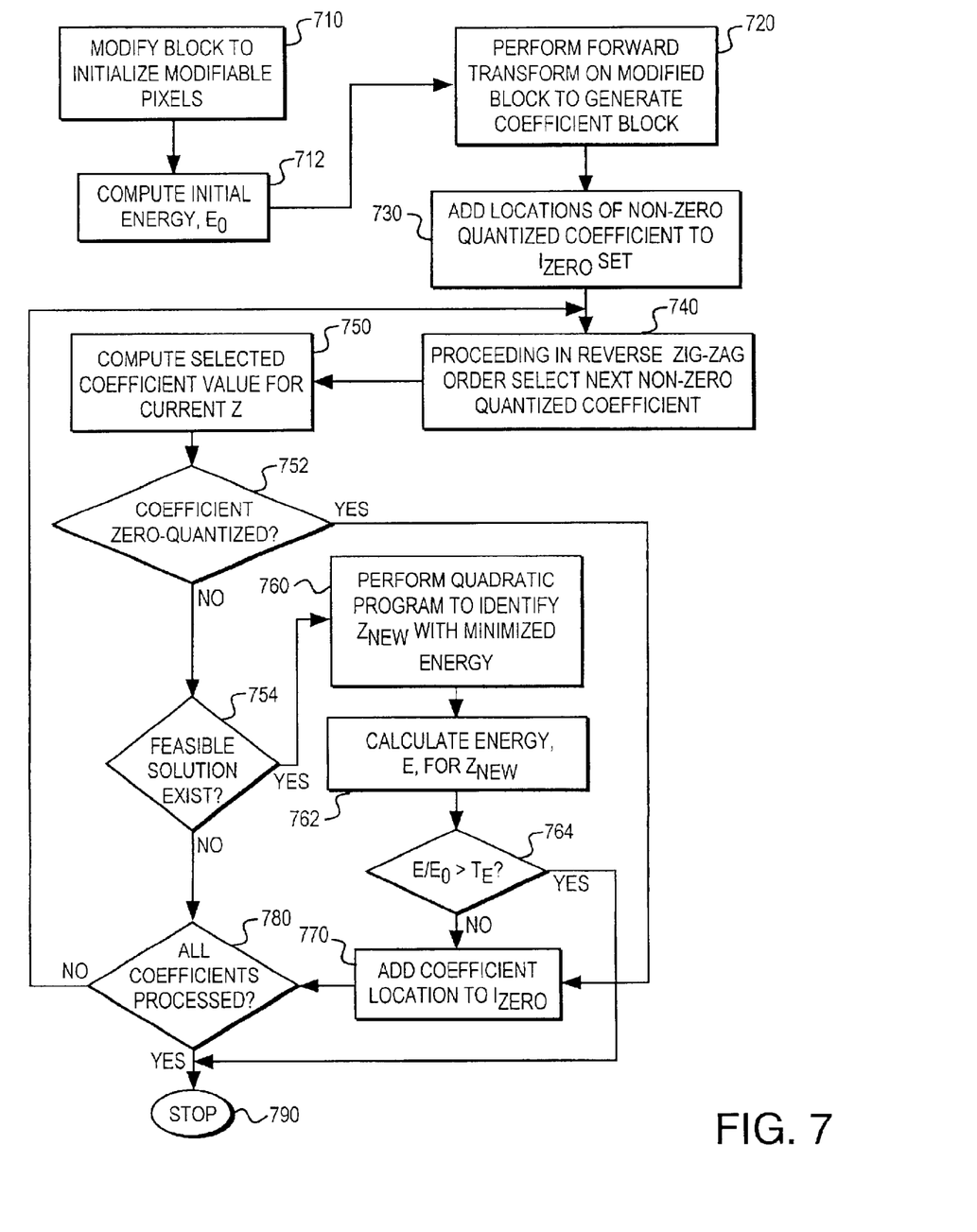
FIG. 7 illustrates a method of modifying the spectral content of a selected block of pixels subject to a plurality of constraints.

FIGS. 6–7 illustrate the process in graphical form. In step 610, a block of pixels containing at least a portion of a source image is selected. The selected block pixels are classified as relevant or irrelevant in step 620.

If the block contains a mix of relevant and irrelevant pixels as determined by step 630, then the optimization process of FIG. 7 is invoked in step 650 before the standard block compression algorithm (e.g., JPEG) is applied in step 670. If the block consists only of irrelevant pixels as determined by step 650, then the block is modified by assigning all the pixels a common pre-determined value such as 0 or the average of the relevant pixels from a preceding block in step 660 before being processed in step 670. If the block consists only of relevant pixels (i.e., nonmodifiable), then the standard block compression algorithm is applied in step 670 without modifying the selected block.

FIG. 7 illustrates the pre-compression optimization process for blocks having a mix of relevant and irrelevant pixels. The irrelevant pixels are initialized in step 710. In one embodiment, the irrelevant pixels are set to a value corresponding to the average pixel value of the relevant pixels in the selected block. In step 712, the energy of the selected block (after initialization) is computed as $E_0$.

In step 720, a coefficient block is generated by applying a forward transform on the selected block. In step 730, the location of all zero quantized coefficients is stored in array $I_{zero}$.

Proceeding in the reverse zig-zag order, the location of a selected non-zero quantized coefficient is identified in step 740. In step 750, the value of the selected coefficient is calculated for the current z.

Step 752 determines whether the selected coefficient is zero quantized. If so, then the location of the coefficient is appended to the $I_{zero}$ set of other zero quantized coefficients in step 770.

If the selected coefficient is not zero quantized, then step 754 determines whether a feasible solution exists that results in a zero quantized coefficient subject to the previously identified constraints. In one embodiment, a Phase 1 linear program is used to identify such a feasible solution. In one embodiment, the simplex method is used to identify feasible solutions. If no feasible solution exists, processing continues to step 780.

If a feasible solution exists, a quadratic program is used to identify the minimal energy solution for z in step 760. This new z has an associated energy, E, which is calculated in step 762.

Step 764 determines whether $$\frac{E}{E_0} > T_{E'}$$

where $T_E$ is an acceptable threshold value for the proportion of E to $E_0$. If $$\frac{E}{E_0} \leq T_E$$

then the coefficient location is added to the $I_{zero}$ set of other zero quantized coefficients in step 770 and processing continues with step 780.

Proceeding from either step 754 or step 770, a check is performed in step 780 to determine whether there are any more coefficients to be processed. If not, then the modification process for the coefficient block is completed in step 790. Otherwise, the process continues with the next non-zero quantized coefficient by returning to step 740.

The optimization process repeats steps 740–780 until all non-zero quantized coefficients have been processed or until the energy of the result exceeds the pre-determined threshold.

Although the process above describes the basic method when the block is initialized by assigning the average value of the relevant pixels to all of the irrelevant pixels, the computations may be less complex when operating in a translated domain. By using the translational transformation:

$$z'_i = z_i - \frac{1}{N_y} \sum_{i=0}^{N_y-1} y_i$$

the quadratic cost function can be converted to a simple energy function. All of the other constraints must similarly be appropriately shifted by the average relevant pixel value. The irrelevant pixels, for example, are initialized to zero.

In one embodiment, the process stops the first time a feasible solution cannot be found regardless of whether additional coefficients remain to be processed. This approach maximizes the length of the last run on zeroes. The last run has the most significant effect on coded rate for JPEG encoders due to the principle of operation of the entropy encoder.

Figure 8:
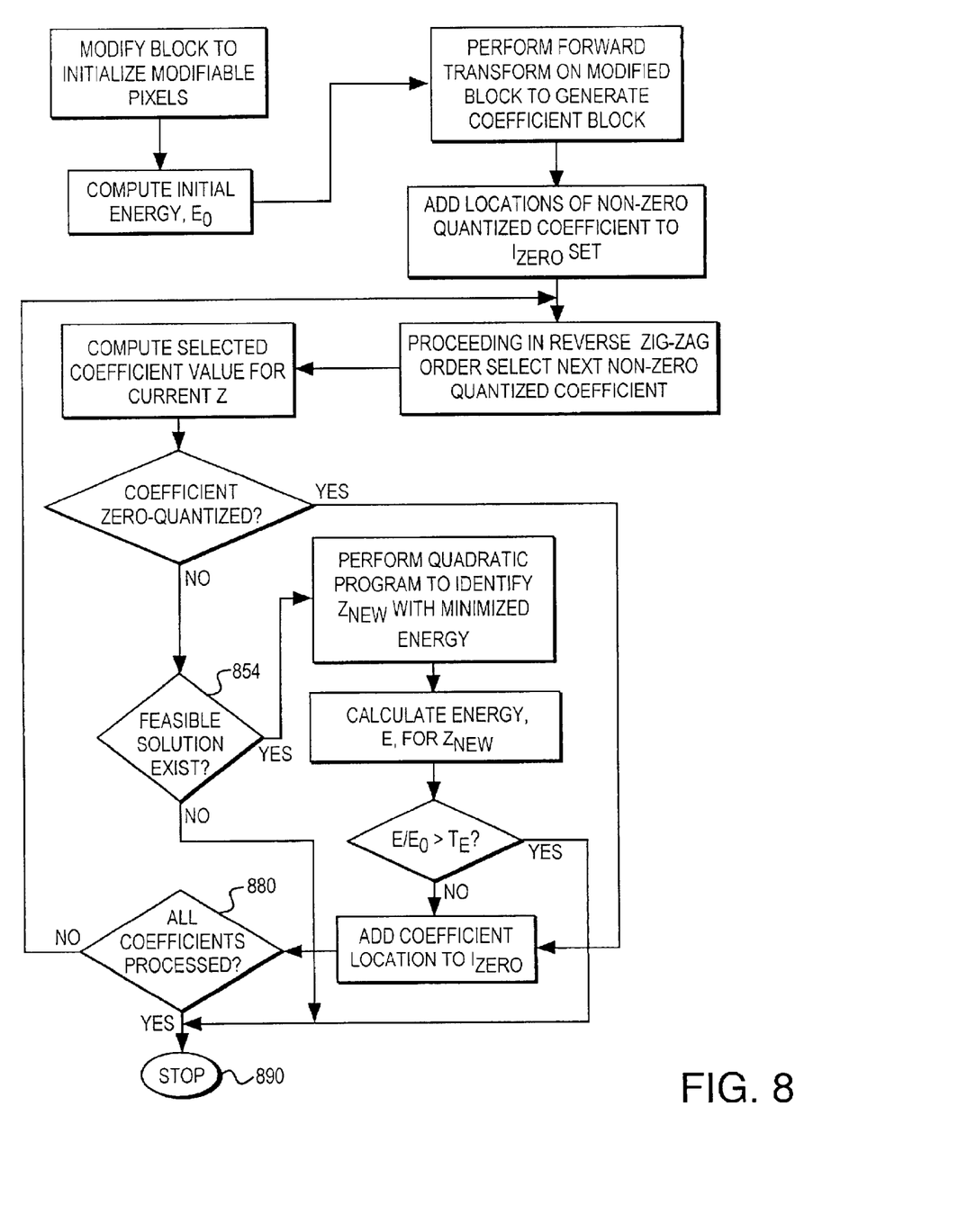
FIG. 8 illustrates an alternative embodiment of a method of modifying the spectral content of a selected block of pixels subject to a plurality of constraints.

FIG. 8 illustrates an alternative embodiment of the method of FIG. 7 that stops searching for additional non-zero quantized coefficients after encountering a coefficient for which there is no feasible zero quantized solution. Comparing FIGS. 7–8, once step 854 determines that no feasible solution exists, the process terminates in step 890 instead of preparing to handle any subsequent non-zero quantized coefficients in step 880.

Figure 9:
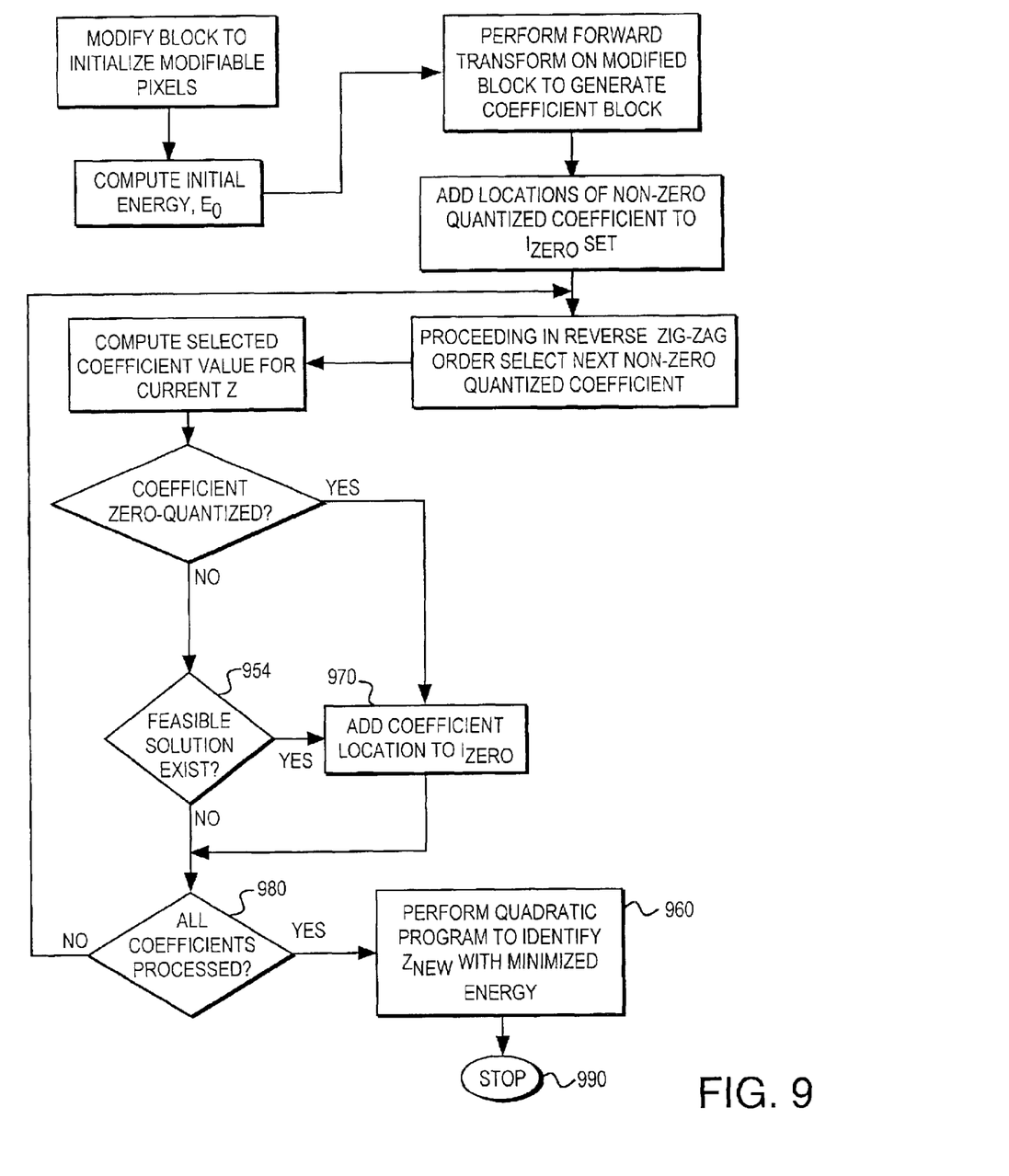
FIG. 9 illustrates another embodiment of a method of modifying the spectral content of a selected block of pixels subject to a plurality of constraints

FIG. 9 illustrates another variation in which the quadratic program is performed only at the end stage (i.e., after all coefficients have been processed). Thus if step 954 determines a feasible solution exists, the coefficient location is still added to $I_{zero}$ in step 970. The quadratic program is applied in step 960, however, only after there are no more coefficients to process as determined by step 980. The process is then completed in step 990.

The method of spectral content manipulation tends 1) to increase the number of zero quantized coefficients, and 2) to prioritize increasing the number of consecutive zero quantized coefficients associated with higher frequency basis functions. Given the idiosyncrasies of entropy encoders, this enables the JPEG encoder to represent the relevant image using less data before issuing an end of block.

One particular advantage of the improved process is that no modification needs to be made to the decoder. Thus although greater computational resources may be required to generate the compressed image data, no additional resources are required for decoding the compressed data. In addition, there is no difference in the relevant portion of the image reconstructed from compression without pixel manipulation and the image reconstructed from compression with pixel manipulation because the relevant pixels are preserved.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of manipulating spectral content of a block of pixels for compression comprising the steps of:
   a) classifying each pixel within a selected block of pixels as relevant or irrelevant;
   b) generating a coefficient block representing a forward transform of the selected block; and c) modifying coefficient values to generate a modified coefficient block subject to a set of pre-determined constraints including a constraint that the relevant pixels have a same value in an inverse transformation of the modified coefficient block as in the selected block.

2. The method of claim 1 further comprising the steps of:

d) repeating steps a)–c) for every block of pixels of the source image.

3. The method of claim 1 wherein step c) includes the steps of:

i) selecting a coefficient from the coefficient block in a reverse zig-zag order wherein the selected coefficient has a non-zero value; and ii) finding a feasible solution resulting in a zero quantizable selected coefficient subject to the pre-determined constraints.

4. The method of claim 3 wherein the coefficient value is modified subject to a constraint that no zero quantizable coefficient preceding the selected coefficient in the reverse zig-zag order is permitted to become non-zero quantizable.

5. The method of claim 1 further comprising the step of:

d) entropy encoding the coefficient block to generate compressed data corresponding to the selected block.

6. The method of claim 1 wherein values of individual elements of a mask classify pixels in corresponding positions within the selected block as relevant or irrelevant.

7. The method of claim 1 wherein the selected block includes relevant pixels associated with an object and irrelevant pixels not associated with the object.

8. The method of claim 1 further comprising the step of:

d) providing the modified coefficient block to a block compression process.

9. The method of claim 1 wherein step d) further comprises the step of applying a linear program to identify a feasible solution resulting in a zero-quantizable coefficient subject to the constraints.

10. The method of claim 9 further comprising the step of applying a quadratic program to generate a modified selected block having minimal energy.

11. The method of claim 10 further comprising the step of terminating further modifications to the coefficient block if a ratio of the energy of the modified block to the energy of the initial selected block exceeds a pre-determined threshold.

12. The method of claim 1 wherein step b) further comprises the step of assigning an average relevant pixel value to every irrelevant pixel before performing a forward transform.

13. The method of claim 1 wherein the forward transform is one of a discrete cosine, a discrete sine, and a discrete Fourier transform.

14. A method of manipulating spectral content of a block of pixels for compression comprising the steps of:

a) providing a source block of pixels from a source image;

b) classifying the pixels as modifiable or nonmodifiable;

c) performing a forward transform on the selected block;

d) quantizing the transformed block to generate a quantized coefficient block; and e) modifying at least one coefficient to produce a corresponding zero quantized coefficient subject to a plurality of constraints including the constraint that the coefficient is modified without altering pixel values of an inverse transform that correspond to nonmodifiable pixels in the selected block.

15. The method of claim 14 wherein the non-zero quantized coefficients are selected for modification from the quantized coefficient block proceeding in reverse zig-zag order.

16. The method of claim 14 wherein values of individual elements of a mask classify pixels in corresponding positions within the selected block as relevant or irrelevant.

17. The method of claim 14 wherein the modifiable pixels are modified subject to the constraint that no zero quantized coefficient preceding the selected non-zero quantized coefficient may become non-zero.

18. The method of claim 14 wherein the forward transform is a selected one of a discrete cosine, a discrete sine, and a discrete Fourier transform.

19. The method of claim 14 further comprising the step of:

f) applying entropy encoding to the modified coefficient block to generate compressed image data.

20. The method of claim 16 further comprising the step of:

f) repeating step e) to increase a number of zero quantized coefficients proceeding in a reverse zig-zag order subject to a constraint that no preceding zero quantized coefficient may become non-zero quantized.

* * * * *